United States Patent [19]

Meyer et al.

[11] Patent Number: 5,435,409
[45] Date of Patent: Jul. 25, 1995

[54] DEFORMATION SENSOR FOR A SAFETY DEVICE FOR THE PROTECTION OF VEHICLE OCCUPANTS IN THE EVENT OF A SIDE-ON COLLISION

[75] Inventors: Michael Meyer, Sindelfingen; Ulrich Tschaeschke, Ehningen; Bernhard Holzapfel, Remshalden; Guido Wetzel, Neuborg/Donau, all of Germany

[73] Assignee: Mercedes Benz AG, Stuttgart, Germany

[21] Appl. No.: 282,428

[22] Filed: Jul. 29, 1994

[30] Foreign Application Priority Data

Jul. 29, 1993 [DE] Germany ............ 43 25 414.4

[51] Int. Cl.[6] ............................................ B60K 28/10
[52] U.S. Cl. .................................... 180/274; 280/735; 280/730.2
[58] Field of Search ............ 280/730 A, 734, 735; 180/268, 274

[56] References Cited

U.S. PATENT DOCUMENTS

| | | | |
|---|---|---|---|
| 5,149,165 | 9/1992 | Woolley | 296/68.1 |
| 5,172,790 | 12/1992 | Ishikawa et al. | 180/268 |
| 5,224,733 | 7/1993 | Simsic | 280/730 A |
| 5,277,441 | 1/1994 | Sinnhuber | 280/730 R |
| 5,281,780 | 1/1994 | Haland | 200/52 R |

FOREIGN PATENT DOCUMENTS

| | | |
|---|---|---|
| 0518381 | 6/1992 | European Pat. Off. . |
| 2212190 | 9/1973 | Germany . |
| 2149158 | 10/1978 | Germany . |
| 3716168 | 11/1988 | Germany . |
| 4241382 | 6/1993 | Germany . |
| 2276355 | 9/1994 | United Kingdom . |

*Primary Examiner*—Kenneth R. Rice
*Attorney, Agent, or Firm*—Evenson, McKeown, Edwards & Lenahan

[57] ABSTRACT

A deformation sensor for a safety device for the protection of vehicle occupants against a side-on collision is disclosed. The deformation sensor is composed of two pressure-sensitive signal elements arranged in parallel and one behind the other, so that the deformation speed can be concluded from the time sequence of the sensor signals. The signal elements ace integrated into a protective strip of the vehicle mounted on the outside of the shell. This ensures a rapid response in the event of a collision, and moreover the assembly of the deformation sensor becomes much easier. The signal elements take the form of FSR foil pressure sensors (Force Sensing Resistor).

7 Claims, 1 Drawing Sheet

DEFORMATION SENSOR FOR A SAFETY DEVICE FOR THE PROTECTION OF VEHICLE OCCUPANTS IN THE EVENT OF A SIDE-ON COLLISION

BACKGROUND AND SUMMARY OF THE INVENTION

The invention relates to a deformation sensor for a safety device.

Passive safety devices which are triggered in the event of an accident without the assistance of the vehicle occupants have been known for a very long time. For example, airbag systems have been installed as standard equipment in motor vehicles in which an air cushion is inflated automatically when the vehicle collides with an obstacle. The aim is also to arrange airbag systems on vehicle side walls or vehicle doors, in order to improve the protection of the vehicle occupants in the event of a side-on collision of the vehicle. Ideally, the side airbag has a relatively large volume in the inflated and deployed state and extends over the entire height of the side wall or door and covers a window aperture.

Since motor vehicles have only minimal collapsible zones in the side region which can absorb some of the collision energy, the timespan available for bringing the side airbag into a state effective for protection is very much shorter than in the case of a front collision.

German Patent Document DOS 3,716,168 describes a deformation sensor which is arranged directly under the shell in the side region of the vehicle and which extends over the entire width of a door. The deformation sensor is composed of two pressure-sensitive signal elements which are arranged a short distance one behind the other and which, in the event of a deformation of predetermined intensity, transmit an electrical signal to an evaluation circuit. The evaluation circuit checks the time sequence of the transmitted signals and, if the sequence is correct and other preconditions regarding intensity and duration are satisfied, triggers the safety device. The time interval between the first signal and the signal of the second signal element depends on the distance in space between the two signal elements and on the speed with which an obstacle dents the motor vehicle. This criterion for the deformation speed makes it possible, with restriction, to conclude that there is imminent danger for the occupants, and therefore, when a critical deformation speed is exceeded, the safety device is triggered. This avoids an unnecessary triggering of the safety device when an obstacle deforms the shell of the vehicle very slowly.

In order to avoid the outlay and weight of an additional supporting profile, the known deformation sensors are preferably used in conjunction with an already existing reinforcing profile, as is also known from EP 0,518,381 A1. Since the latter should run close under the shell, there is very little constructional space available. The disadvantage of this is that the deformation speed is determined inaccurately, since the deformation travel taken as a basis is very small, and, furthermore, the mounting or exchange of the deformation sensor is complicated and therefore costly.

One possibility of avoiding the constraint of the available constructional space is to integrate the first (outer) signal element into a protective strip mounted on the outside of the shell of the vehicle and to mount an inner signal element on the shell from inside at a specific distance from a reinforcing profile, as is known from German Patent Document DE 4,241,382 A1. The shell at the same time forms a sufficiently rigid support for the outer signal element. According to the publication mentioned, a deformation occurs only after electrical contact is made in the outer signal element. Subsequently, with an increasing deformation of the shell, the inner signal element moves in the direction of the reinforcing profile and, after a time span dependent on the deformation speed, comes to bear on the reinforcing profile, thereby causing contact to be made in the inner signal element. A disadvantage of this arrangement is that the distance between the shell and the reinforcing profile is constant over the door width and determined exactly only in very rare instances. Consequently, only imprecise information regarding the deformation speed can be obtained from the recorded time span.

Furthermore, German Patent Documents DE 2,212,190 A1 and DE 2,149,158 B2 disclose a deformation sensor in which the two signal elements are integrated into the protective strip. Both known sensors are designed so that their response thresholds are below the force which leads to a deformation of the shell. This is a serious disadvantage, particularly in use for triggering an airbag where a high response threshold is desired in order to avoid faulty triggerings.

Am object of the invention is to provide a deformation sensor of the generic type which avoids the disadvantages of the known deformation sensor.

This object is achieved by a deformation sensor for a safety device for the protection of vehicle occupants against a side-on collision, which is composed of at least one pressure-sensitive signal element and which is arranged in a side region of the motor vehicle, at least one signal element being integrated into a protective strip mounted on an outside surface of the shell of the vehicle, the protective strip having integrated signal elements forming an elongate sectional bearer which can be compressed by a perpendicular force effect exceeding a specific threshold, with the result that the signal elements respond, wherein a predetermined threshold of the signal element is so high that, in the event of a perpendicular force effect on the protective strip, the shell is deformed, without a signal element being triggered, until a reinforcing profile arranged behind the shell opposes a further deformation of the shell, whereupon at least one signal element is loaded with pressure and responds.

During assembly, the signal elements, integrated according to the invention into the protective strip, are mounted together with the protective strip in one operation, while the connecting leads can be guided through the shell into the interior of the door through lead tunnels provided specifically for this purpose. In the event of a defect of a signal element, the entire protective strip is exchanged with little labor being involved. A further advantage is that the signal elements are welded in within the protective strip in an air-tight and water-tight manner and can consequently be protected against environmental influences in the best possible way, thereby improving the lifetime and reliable functioning of the signal elements. Moreover, the deformation sensor according to the invention requires no additional carrier or constructional elements increasing the weight of the vehicle, but makes use of already existing elements.

Advantageous embodiments and developments of the deformation sensor according to the invention are described herein. Thus, in the developments, provision is made, analogously to the deformation sensor described in German Patent Document DOS 3,716,168, for arranging two signal elements one behind the other in parallel, while one signal element or both can be accommodated in the protective strip. The determination of the deformation speed thereby becomes more accurate, since the distance between the signal elements arranged one behind the other is comparatively large and is predetermined very precisely.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
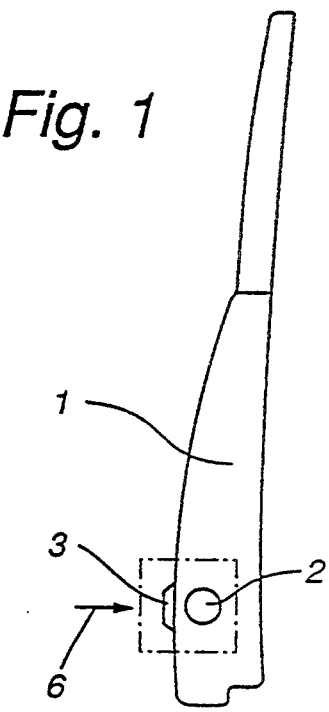
FIG. 1 is a schematic view which shows a side door of a motor vehicle with a system constructed according to preferred embodiments of the invention.

FIG. 1 shows, greatly simplified, a cross-sectional view of a side door of a motor vehicle, in which a protective strip 3 is mounted from outside on the shell 1. There extends behind the shell 1, at the same height as the protective or trim strip 3, a reinforcing profile 2 which, as a result of its high rigidity, transmits most of a lateral force effect 6 to the vehicle which thereupon experiences acceleration. The frame represented by broken lines reproduces the cutout which is reproduced enlarged in the subsequent figures for the purpose of explaining the exemplary embodiments.

Commercially available FSR foil-pressure sensors can be provided as signal elements which can be integrated into the protective strip 3. The designation FSR is a registered trademark and an abbreviation of "Force Sensing Resistor". These are pressure-sensitive resistors of the thick-film type, the electrical resistance of which decreases with an increasing force exerted in the direction perpendicular to the sensor surface. It is thus possible to have an embodiment in which the electrical resistance is inversely proportional to the imparted force within a wide range of almost three powers. However, embodiments with a pronounced switching characteristic are also possible. The FSR elements are cost-effective, can be produced in any dimensions and have very rapid mechanical response times of the order of magnitude of one millisecond.

Figure 2:
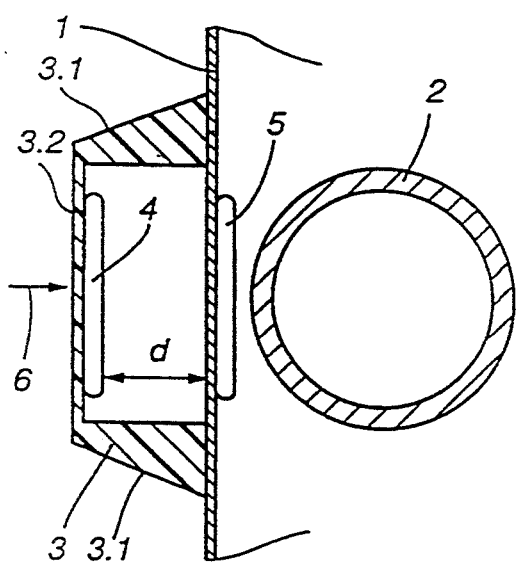
FIG. 2 is a schematic sectional view which shows a first exemplary embodiment of a protective strip with an integrated signal element.

The deformation sensor in FIG. 2 consists, in a first simple version, of a single signal element 4 which is mounted within the protective strip 3, on the rear side of a cover strip 3.2, parallel to the shell 1 and at a distance d from the latter. The cover strip 3.2 should be rigid and be produced so as to have little intrinsic deformability, so that, in the event of a side on collision, the local force effect 6 is guided to the shell 1 via the distancing or spacing elements 3.1 supporting the cover strip 3.2.

So that the deformation sensor responds only to pronounced deformations, it is advantageous to rate the deformation resistance of the distancing elements 3.1 so high that the force effect 6 initially deforms the shell 1. Only when the reinforcing profile 2 opposes a further deformation of the shell 1 do the distancing elements 3.1 yield to the increasing pressure by experiencing deformation, with the result that the signal element 4 is brought nearer to the shell 1. After the deformation travel d has been covered, the force 6 acts directly on the signal element 4 and leads to the triggering of a deformation signal.

Proceeding from this arrangement, the deformation sensor can be developed by mounting a second signal element 5 in the door interior, between the shell 1 and the reinforcing profile 2, in order to allow a sensing of the deformation speed. The second signal element 5 is preferably fastened to the reinforcing profile 2 or to the shell 1, as shown in FIG. 2. This second signal element 5 triggers a deformation signal at the moment when the skin 1 is pressed against the reinforcing profile 2. The local deformation speed can be determined from the time difference between the deformation signals of the two signal elements 4 and 5, the signal element 5 responding first, and the effective deformation travel d.

Figure 3:
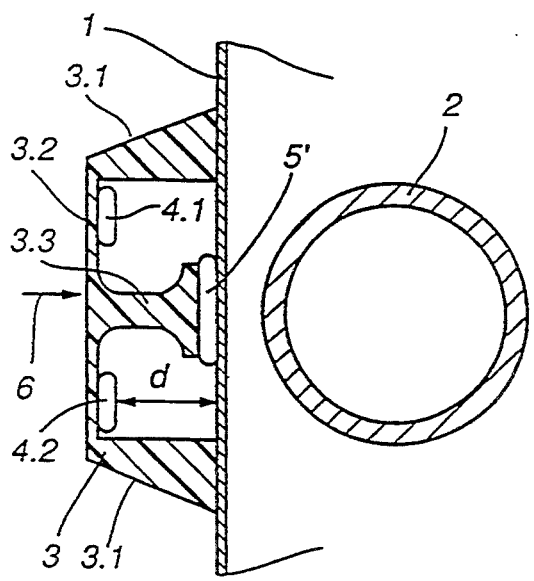
FIG. 3 is a schematic sectional view which shows a second exemplary embodiment of a protective strip with a plurality of integrated signal elements.

FIG. 3 illustrates an especially advantageous embodiment, in which all the signal elements 4.1, 4.2, 5' required for determining a deformation speed are integrated within the protective strip. However, the displacement of the second signal element 5' from the door interior into the interior of the protective strip 3 means that a supporting element 3.3 has to be introduced. This supporting element 3.3 extends from the cover strip 3.2 to the signal element 5' mounted on the outside of the shell 1. The supporting element 3.3 makes the operative connection, in order to load the signal element 5' with pressure when the shell 1 butts against the reinforcing profile 2. On account of the connection of the supporting element 3.3 to the cover strip 3.2, the first signal element fastened to the cover strip 3.2 must be distributed over the remaining surface, for example by being divided into two parallel-connected signal elements 4.1 and 4.2.

Similarly to what has already been shown by means of the first exemplary embodiment, the following sequence occurs in the event of a side-on collision. A pronounced force effect 6 is transmitted from the protective strip 3 to the easily deformable shell 1, without one of the signal elements 4.1, 4.2, 5' triggering a deformation signal. Only when the shell 1 butts against the reinforcing profile 2 is the signal element 5' loaded with significant pressure and triggers a first deformation signal. If the force effect 6 persists, the deformation resistance of the distancing elements 3.1 and of the supporting element 3.3 is overcome on account of the high strength of the reinforcing profile 2 and the cover plate 3.2 is brought nearer to the shell 1, until the deformation travel d is used up and the first signal elements 4.1, 4.2 also trigger a second deformation signal. With the deformation travel d known, the deformation speed can be determined from the time difference between the first and second deformation signals.

Advantageously, the deformation sensor illustrated in FIG. 3 can be produced as a composite part with the protective strip 3 and can be mounted complete on the shell 1 from outside. For this purpose, the protective strip 3 is designed as a sectional bearer, sealed over its entirety, into which the signal elements are integrated, the second signal element 5' not resting directly on the shell 1, but on a thin base strip (not shown) which itself rests on the shell 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Deformation sensor for a safety device for the protection of vehicle occupants against a side-on collision, which is composed of at least one pressure-sensitive signal element and which is arranged in a side region of the motor vehicle, at least one signal element being integrated into a protective strip mounted on an outside surface of the shell of the vehicle, the protective strip having integrated signal elements forming an elongate sectional bearer which can be compressed by a perpendicular force effect exceeding a specific threshold, with the result that the signal elements respond, wherein a predetermined threshold of the signal element is so high that, in the event of a perpendicular force effect on the protective strip, the shell is deformed, without a signal element being triggered, until a reinforcing profile arranged behind the shell opposes a further deformation of the shell, whereupon at least one signal element is loaded with pressure and responds.

2. Deformation sensor according to claim 1, wherein the deformation sensor is formed from outer and inner sensor planes arranged parallel to the shell and spaced a predetermined short distance from one another, the outer sensor plane having first signal elements and the inner sensor plane having second signal elements.

3. Deformation sensor according to claim 2, wherein a first signal element is arranged within the protective strip and a second signal element is arranged under the shell of the vehicle.

4. Deformation sensor according to claim 2, wherein the two sensor planes having the first and second signal elements are arranged within the protective strip.

5. Deformation sensor according to claim 1, wherein the protection strip is configuredf such that when the force effect persists, the protective strip is compressed and further signal elements can thereby be triggered.

6. Device according to claim 1, wherein the signal elements are formed from FSR foil-pressure sensors (Force Sensing Resistor).

7. Device according to claim 1, wherein the safety device is an inflatable airbag.

* * * * *